United States Patent

Takei et al.

[11] Patent Number: 6,151,288
[45] Date of Patent: Nov. 21, 2000

[54] OPTICAL HEAD ASSEMBLY

[75] Inventors: Yuichi Takei; Tadashi Takeda; Yoshio Hayashi, all of Nagano, Japan

[73] Assignee: Sankyo Seiki Mfg. Co., Ltd., Nagano, Japan

[21] Appl. No.: 09/115,212

[22] Filed: Jul. 14, 1998

[30] Foreign Application Priority Data

Jul. 16, 1997 [JP] Japan ................................ 9-190829

[51] Int. Cl.[7] ..................................................... G11B 7/12
[52] U.S. Cl. ........................ 369/109; 369/112; 369/44.12
[58] Field of Search .................................. 369/112, 109, 369/103, 44.12, 44.14, 44.23

[56] References Cited

U.S. PATENT DOCUMENTS 5,361,244  11/1994  Nakamura et al. .............. 369/44.12 X

FOREIGN PATENT DOCUMENTS

6-76340   3/1994  Japan .
6-302011  10/1994  Japan .

*Primary Examiner*—Muhammad Edun
*Attorney, Agent, or Firm*—Reed Smith Shaw & McClay LLP

[57] ABSTRACT

An optical head assembly comprises a laser light source, an objective lens for converging a laser light emitted from the laser light source on an optical recording medium, an optical detector for detecting a returning light from the optical recording medium, a diffraction unit mounted in an optical path between the laser light source and objective lens for positioning multiple diffraction grating means, a base of the optical head assembly for supporting the objective lens, the laser light source and the optical detector, and a diffraction grating unit retaining portion formed on the base for holding the diffraction grating unit.

11 Claims, 6 Drawing Sheets

FIG. 6B

OPTICAL HEAD ASSEMBLY

BACKGROUND OF THE INVENTION a) Field of the Invention

The present invention relates to an optical head assembly used for recording to and reproducing from an optical recording medium.

b) Description of the Related Art

An optical head assembly for reproducing optical recording media such as CDS (compact disks), DVDs (digital video disks), etc. is constructed such that a laser light from a laser light source is converged on a recording surface of an optical recording medium through a primary objective lens, a returning light from the recording medium is detected by an optical detector, and data recorded on the optical recording medium is reproduced based on the detection results. Japanese Patent Application Tokkai H6-302011, for example, has disclosed an optical head assembly having two diffraction grating means placed in an optical path between the laser light source and objective lens, one of which splits a laser light from the laser light source into multiple laser beams and the other of which separates a returning from the laser light of an optical recording medium and from the laser light source and guides the returning light to an optical detector. In addition, Japanese Patent Application, Tokkai H6-76340 has disclosed an optical head assembly in which a laser light source, optical detector, and two diffraction grating means are made as an entity.

The diffraction grating means has a predetermined diffraction pattern to obtain a desired diffraction property. Therefore, if the diffraction grating means is not at a right angle with respect to the optical axis of the optical head assembly or the optical axis of the assembly and the diffraction pattern are not in a predetermined positional relationship, a problem occurs in that the returning light from the optical recording medium will not be efficiently guided to the optical detector. Conventionally, the diffraction grating means is constructed such that a mounting position and angle can be changed arbitrarily. The mounting position and angle of the diffraction grating means are adjusted while the diffracting direction of the diffraction grating is identified using a microscope or the output of the optical detector is observed.

While the mounting position and facing direction of the diffraction grating means can be changed arbitrarily, however, it takes time to adjust them to an optimal condition. In other words, as the optical head assembly disclosed in Japanese Patent Application H6-302011 in which two diffraction grating means are used, the mounting position and the like needs to be adjusted for each diffraction grating. Therefore, it is difficult to finish adjustment in a short time, increasing cost necessary for the operation. In addition, Japanese Patent Application H6-76340 disclosed that the laser light source, optical detector, and two diffraction grating means are made as an entity. With this configuration, while there is an advantage of making the optical system compact and facilitating the assembly of the optical system, a problem remains that it takes time to adjust the mounting position of the diffraction grating means with respect to the laser light source and the like when making the system as an entity.

OBJECT AND SUMMARY OF THE INVENTION

Considering the above problems, an object of the present invention is to provide an optical head assembly in which an operation of adjusting a diffraction grating means to the best position with respect to an optical axis of the optical head assembly is simplified.

In accordance with the invention, an optical head assembly comprises a laser light source, an objective lens for converging a laser light emitted from the laser light source on an optical recording medium, an optical detector for detecting a returning light from the optical recording medium, a diffraction unit mounted in an optical path between the laser light source and objective lens for positioning multiple diffraction grating means, a base of the optical head assembly for supporting the objective lens, the laser light source and the optical detector, and a diffraction grating unit retaining portion formed on the base for holding the diffraction grating unit.

DESCRIPTION OF THE PREFERRED EMBODIMENTS

An optical head assembly to which the present invention is applied will be described referring to the drawings.

Figure 1:
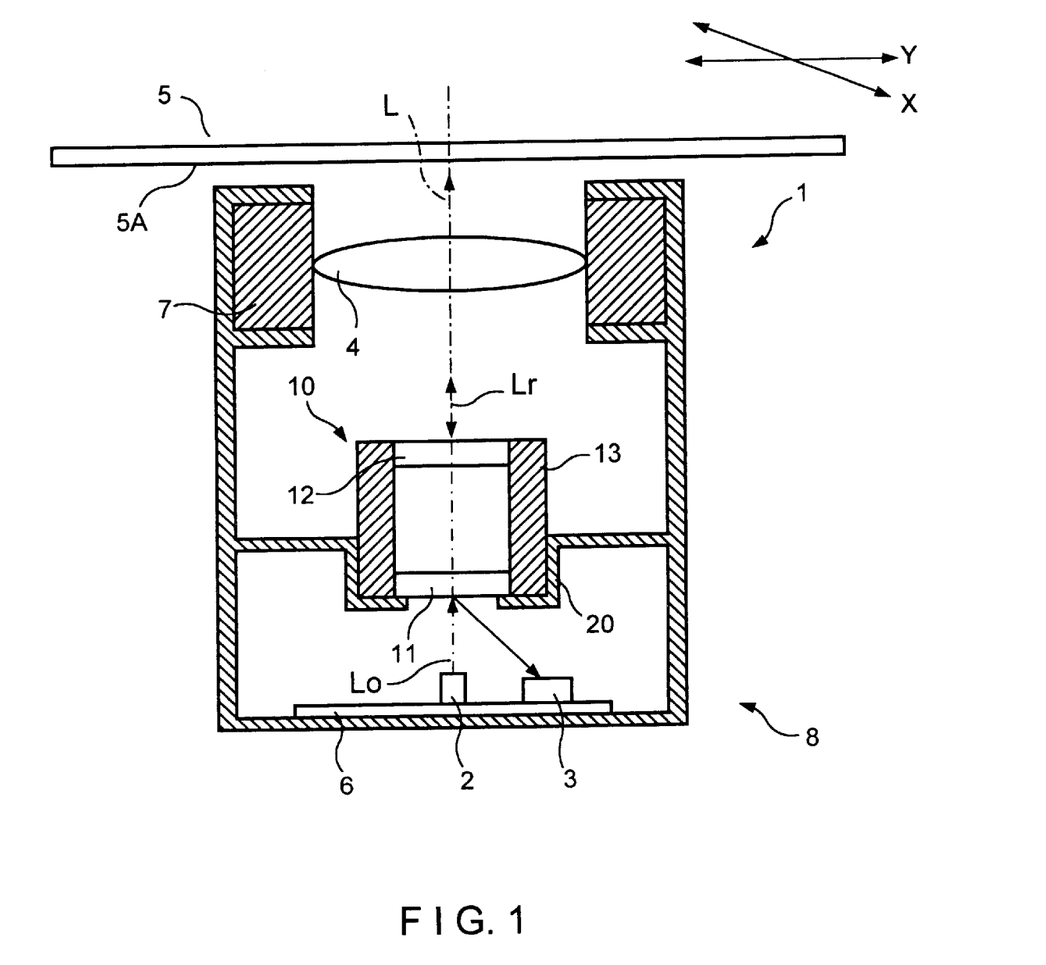
FIG. 1 shows a simple construction of an optical head assembly of the first embodiment of the present invention.

FIG. 1 shows a simple construction of an optical head assembly of the First Embodiment of the present invention. Optical head assembly 1 illustrated in FIG. 1 comprises a laser diode 2 as a laser light source, an optical detector 3, an objective lens 4, and a hologram element unit 10 as a diffraction grating unit. Laser light Lo emitted from the laser diode 2 converges as a small spot on a recording surface 5a of an optical recording medium 5 through the objective lens 4. Returning light Lr converges on a light receiving plane of the optical detector 3 through the hologram element unit 10.

The laser diode 2 and optical detector 3 are both formed on a substrate 6, and the objective lens 4 is held by a lens holder 7. In the optical head assembly 1, the substrate 6, on which the laser diode 2 and optical detector 3 are placed, and the hologram element unit 10 are directly fixed on a base 8. Note that the lens holder 7 is made movable in the focusing and tracking directions of the objective lens 4. The focusing and tracking controls of the objective lens 4 are performed as the lens holder 7 moves in each direction.

The hologram element unit 10, placed in the optical path between the laser diode 2 and objective lens 4, has a first hologram element 11 as a first diffraction grating means and a second hologram element 12 as a second diffraction grating means. In the first embodiment, from the laser diode 2 side, the first hologram element 11 and second hologram element 12 are arranged in this order. The first hologram element 11 is given a predetermined diffraction property so that the returning light Lr from the recording medium 5 is guided to the optical detector 3. The second hologram element 12 is given a predetermined diffraction property to split laser light Lo from the laser diode into multiple laser beams, particularly three beams in the first embodiment.

In the optical head assembly 1, laser light Lo emitted from the laser diode 2 is guided to the hologram element 10, passes through the first hologram element 11, and enters the second hologram element 12. The laser light Lo incident on the second hologram element 12 is diffracted to be split into three beams, one main beam and two sub-beams. Each of the three beams converges as an optical spot on the recording surface 5a of the optical recording medium 5 through the objective lens 4.

The returning light Lr from the optical recording medium 5 is guided to the hologram element unit 10 through the objective lens 4. The returning light Lr reaching the hologram element unit 10 passes through the second hologram element 12 and enters the first hologram element 11. The returning light Lr incident on the first hologram element 11 is diffracted to be converged on the light receiving plane of the optical detector 3. Based on the result of the light intensity received on the optical detector 3, pit (RF) signals, focusing error (FE) signals, and tracking error (TE) signals are detected. In this embodiment, the focusing errors and tracking errors are detected by a well-known astigmatism method or a three-beam method, for example.

Figure 2:
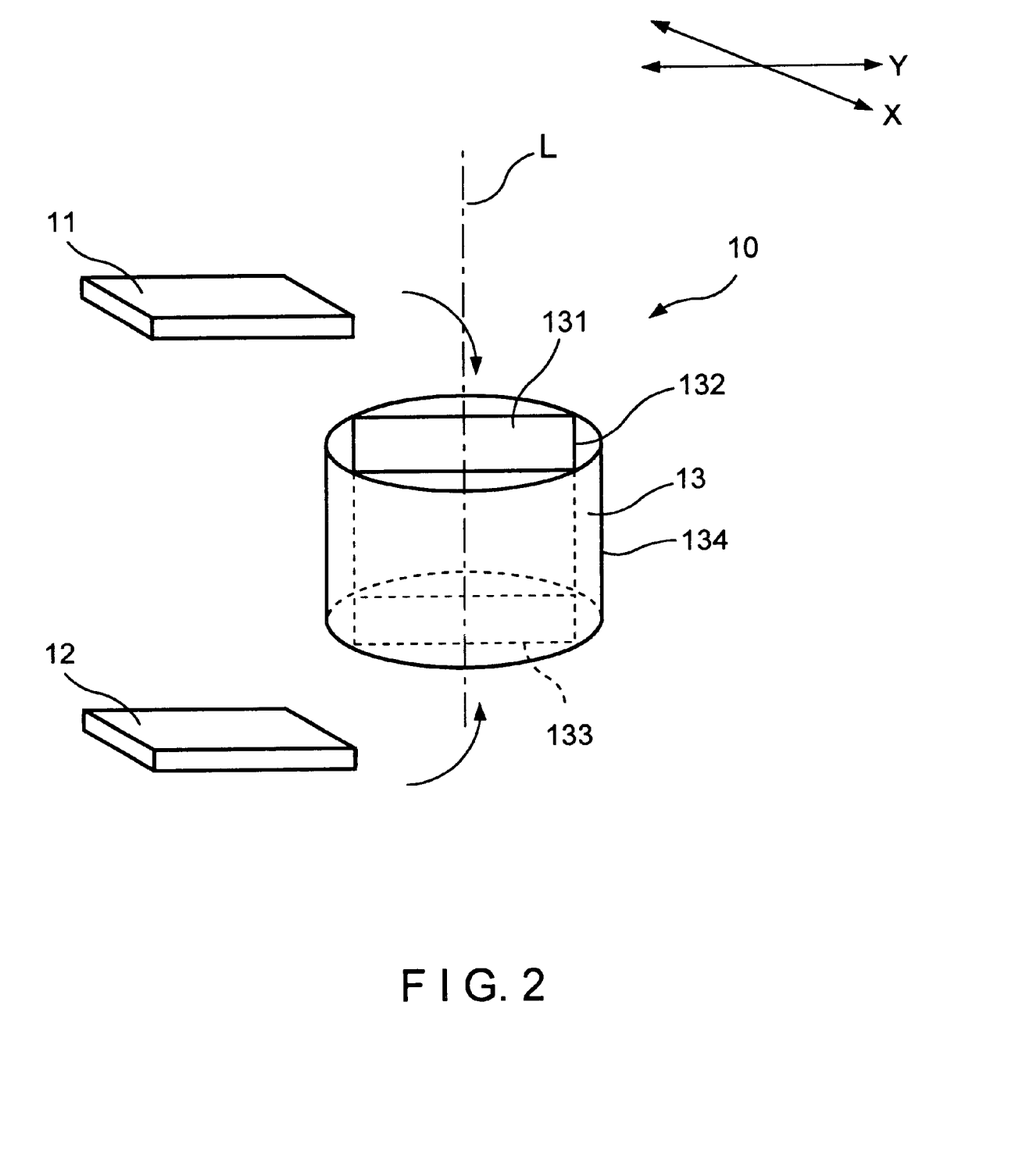
FIG. 2 is a perspective view of a hologram element unit.
Figure 3:
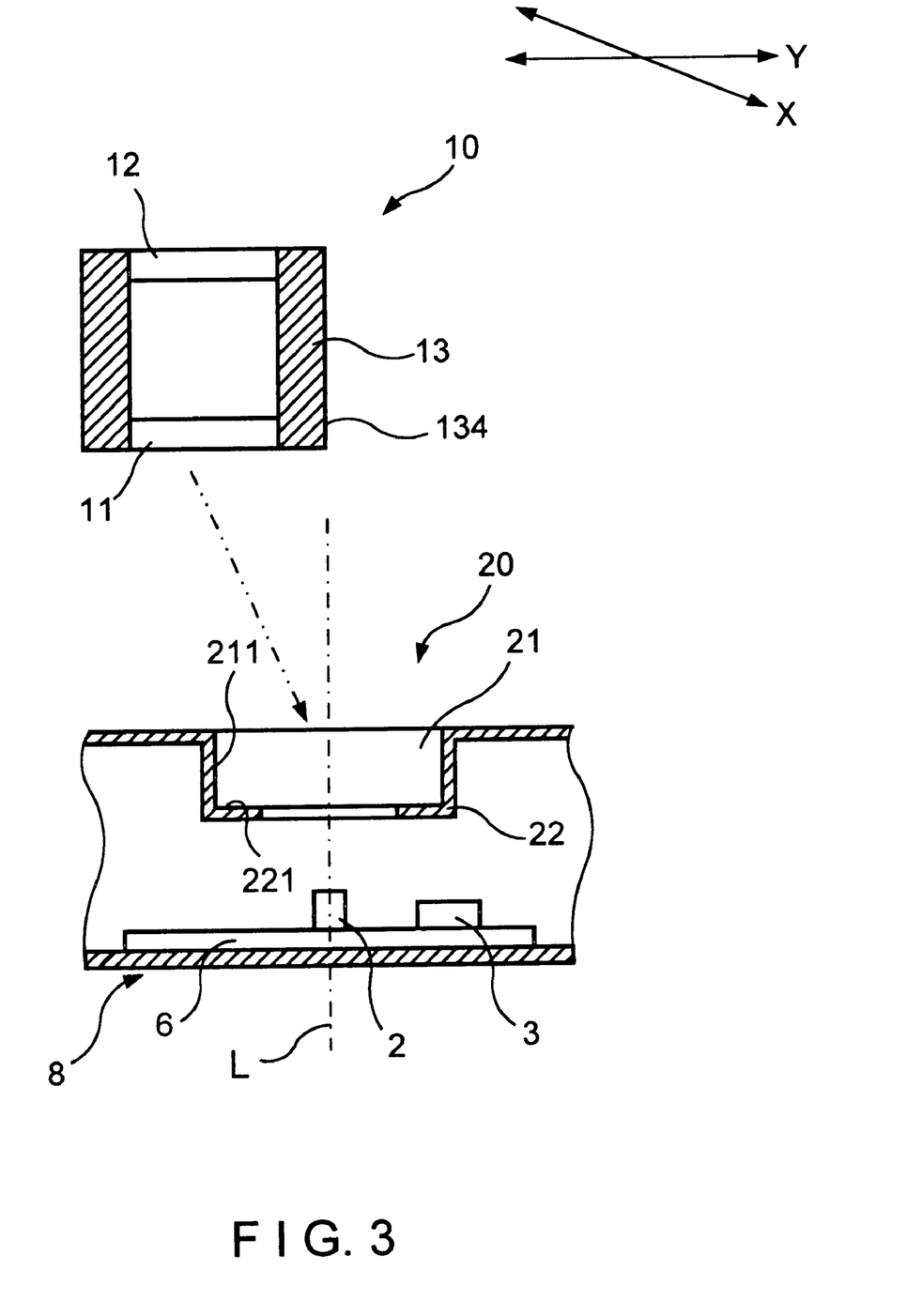
FIG. 3 shows how the hologram element unit is installed in a holder retaining portion formed in the assembly.

FIG. 2 illustrates a construction of the hologram element unit 10 in detail. FIG. 3 illustrates how to install the hologram element unit 10 on the base 8 of the optical head assembly 1.

As illustrated in FIG. 1 and 3, the hologram element unit 10 has the first and second hologram element 11 and 12 and a holder 13 for positioning and holding these elements. In the first embodiment, each of the hologram elements 11 and 12 is a rectangular flat lens and given a predetermined diffraction property as described above. Each of the hologram elements 11 and 12 has a predetermined diffraction pattern on one of the surfaces thereof.

The holder 13 is a cylindrical lens barrel as a cylindrical portion having a rectangular through hole 131 in the center thereof. An outer circumferential side surface of the holder 13 serves as a circumferential surface 134 which extends along the optical axis L (see FIG. 1) of the optical head assembly 1. In the holder 13, opening portions 132 and 133 at top and bottom (in the figure) of the through hole 131 serve as retaining portions for holding the hologram elements 11 and 12, and each of the hologram element 11 and 12 is fitted thereinto. In other words, since the shape of the through hole 131 is identified with the outer feature of each hologram element 11, 12, the mounting position of the hologram element 11, 12 is determined only by fitting each element into the opening portion 132, 133 of the through hole 131. Therefore, both of the opening portions 132 and 133 of the through hole 131 serve as an element positioning portion (a diffraction grating means positioning portion) for positioning each of the hologram elements 11 and 12 so that the distances between the hologram elements 11 and 12 and the diffraction patterns of the elements become identical. Note that an annular projection and the like may be formed on the inner circumferential side surface of the through hole 131 as the element positioning portion.

A holder retaining portion 20 as a diffraction grating unit retaining portion for holding the hologram element unit 10 is constructed on the base 8 using the optical axis L of the optical head assembly 1 as a reference. The holder retaining portion 20 has a holder positioning portion 22 for determining the mounting position of the holder 13 for the hologram element 10 in the optical axis L direction and a guiding plane 211 to which the circumferential surface 134 of the holder 13 fittingly contacts when the holder 13 is rotated around the axial line. The guiding plane 211 is a fiducials surface for determining the position and attitude of the holder 13, as described later.

In the first embodiment, the holder retaining portion 20 is formed on the base 8 to have a circular holder fitting hole 21 (a hole that provides a function as a guiding plane) in which a part of the holder 13 can be fitted. An inner circumferential side surface of the holder fitting hole 21 serves as the guiding plane 211 (fiducials surface). Also an inner circumferential bottom surface of the holder positioning portion 22 (annular bottom portion), which projects from the outer circumferential side to the inner side (optical axis L side) upstream in the optical path (laser light source side) of the holder fitting hole 21, serves as a position-determining plane 221.

In the optical head assembly 1, the holder 13 is attached into the holder fitting hole 21 and accordingly the end surface of the holder 13 on the laser light source side and the holder positioning portion 22 (the position-determining plane 221 of the holder fitting hole 21) contact each other. Thus, the mounting position of the holder 13 in the optical axis L direction is determined. Since the circumferential surface 134 of the holder 13 touches the guiding plane 211 of the holder retaining portion 20, the mounting position of the holder 13 is determined on an XY plane orthogonal to the optical axis L of the assembly, and the attitude of the holder 13 with respect to the optical axis L is also determined.

Figure 4:
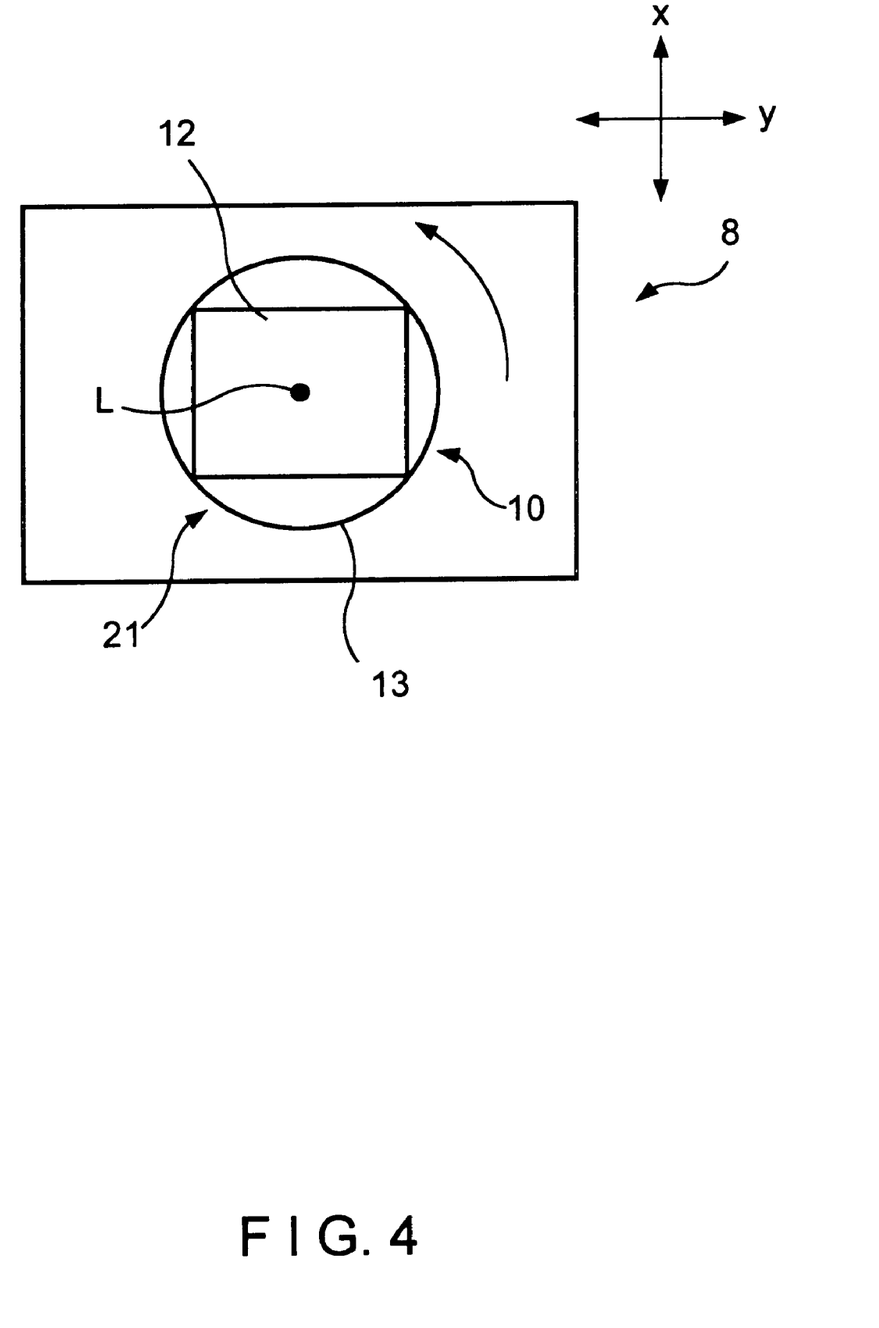
FIG. 4 shows how the hologram element unit is turned in the circumferential direction.

Then, the direction of the diffraction pattern of each hologram element 11, 12 is adjusted in accordance with the position of the optical detector 3. In this embodiment, by rotating the holder 13 around the axial line, the facing direction of each hologram element 11, 12 is changed so that the direction of the grating pattern of each hologram element 11, 12 can be adjusted to be directed to the optical detector 3 and the like, as shown in FIG. 4. Meanwhile, the circumferential surface 134 of the holder 13 fittingly contacts the guiding plane 211 of the holder retaining portion 20; thus, neither the mounting position of the holder 13 in the optical axis L direction as well as the mounting position thereof on the XY plane orthogonal to the optical axis L are displaced, nor is the holder 13 tilted with respect to the optical axis L. In addition, the hologram element unit 10 is made up of the hologram elements 11 and 12 fixed to the holder 13; therefore, the distances between the hologram element 11 and 12 and the diffraction pattern of the elements remain the same as the first set condition.

In the optical head assembly 1, only by attaching the holder 13 of the hologram element unit 10 into the holder attaching holder 21 of the holder retaining portion 20 in this manner, the mounting positions of the hologram element unit 10 in the optical axis L direction and on the XY plane orthogonal to the optical axis L and the attitude thereof with respect to the optical axis L can be adjusted. Further, since the hologram element unit 10 in which each hologram element 11, 12 is fixed to the holder 13 is rotated around the axial line of the optical axis L, the above positions of the hologram element unit 10 will not be displaced even when adjusting the direction of the diffraction pattern of each hologram element 11, 12 is adjusted. Therefore, the operation of adjusting the mounting position of each hologram element 11, 12 after attaching the hologram element unit 10 to the holder fitting hole 21 of the holder retaining portion 20 can be carried out only by rotating the hologram element unit 10 around the axial line of the optical axis L to change the direction of the diffraction pattern thereof. Thus, the adjustment of the positioning of each hologram element 11, 12 with respect to the laser light source 2 and optical detector 3 can be performed in a shorter time, reducing the necessary cost while obtaining fine adjustment precision.

Note that, in the first embodiment, the hologram element unit 10 is fixed to the holder retaining portion 20 with an adhesive and the like after adjusting the mounting positions. Either one of the following methods may be employed for adjusting the mounting position: an active alignment method in which the hologram element unit 10 is rotated while observing the output from the optical detector 3; a method to be carried out while observing the grating pattern of each of the hologram elements 11 and 12 using a microscope; and a method in which marks are given to the hologram element holder 13.

Figure 5:
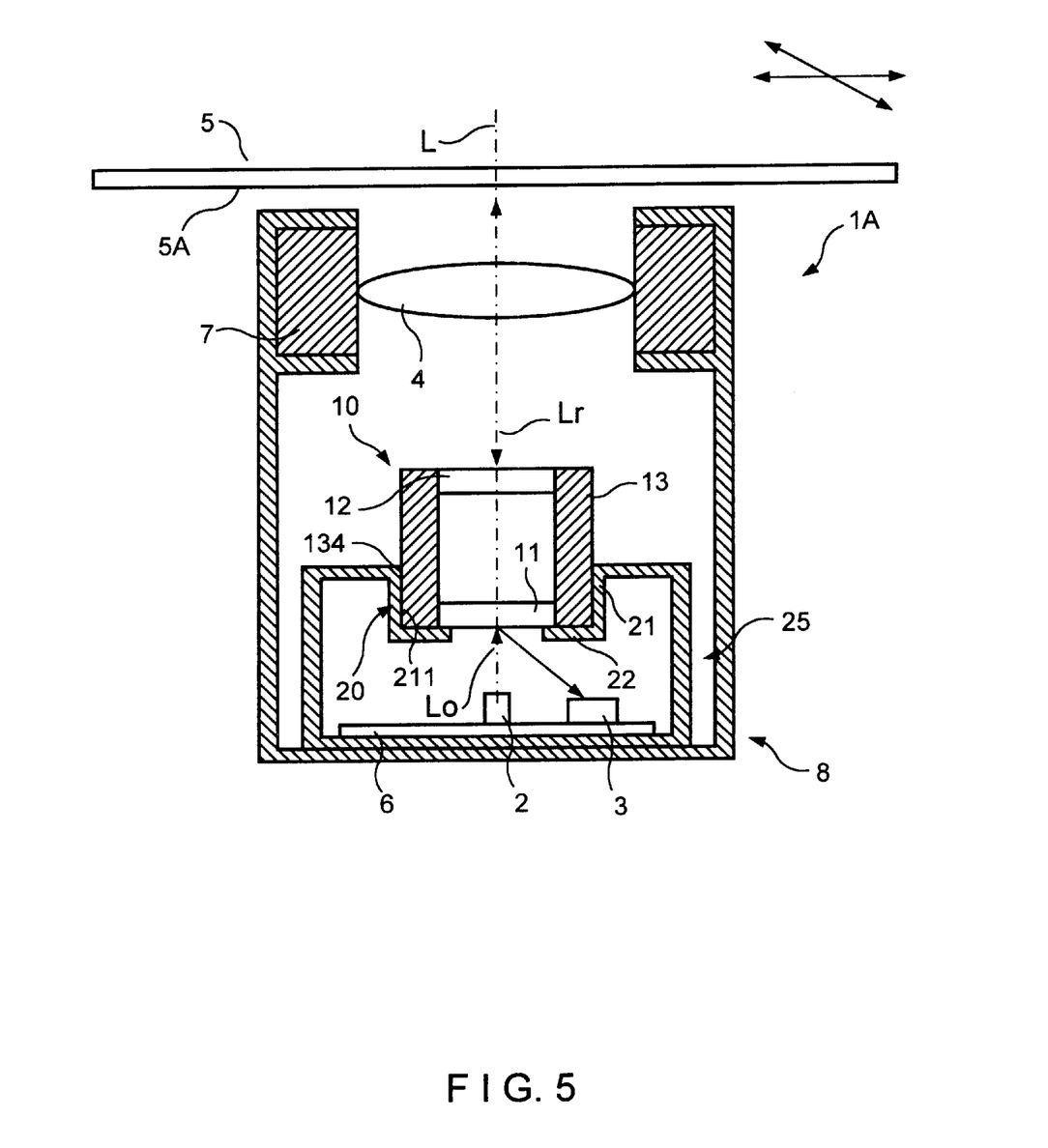
FIG. 5 shows a simple construction of an optical head assembly of the Second Embodiment of the present invention.

FIG. 5 shows a simple construction of an optical head assembly of the Second Embodiment of the present invention. Note that the same structures as in the first embodiment are given the same codes and detailed descriptions thereof are omitted.

In an optical head assembly 1A illustrated in FIG. 5, the hologram element unit 10, laser diode 2, and optical detector 3 are mounted to a frame 25, and the frame 25 is fixed to the base 8 of the optical head assembly 1A.

The lens holder 7 is configured movable in the focusing and tracking directions of the objective lens 4. The focusing and tracking controls of the objective lens 4 are performed as the lens holder 7 moves in each direction. Therefore, in the second embodiment, the holder retaining portion 20 for attaching the hologram element unit 10 which consists of the first and second hologram elements 12 and 13 and holder 13 is constructed on the frame 25.

Even in the optical head assembly 1A, each hologram element 11, 12 is mounted at a predetermined position in the holder 13 to constitute the hologram element unit 10. Therefore, only by attaching the hologram element unit 10 in the holder fitting hole 21 of the holder retaining portion 20, the mounting positions of the hologram element unit 10 in the optical axis L direction and on the XY plane orthogonal to the optical axis L as well as the attitude thereof with respect to the optical axis L can be determined in an optimal condition. In addition, when rotating the hologram element unit 10 around the axial line L of the optical axis to adjust the direction of the diffraction pattern, the circumferential surface 134 of the holder 13 of the hologram element unit 10 fittingly contacts the guiding plane 211 of the holder retaining portion. Therefore, the position and angle of the hologram element unit 10 will not be changed, thus obtaining the same effects as the First Embodiment.

In the optical head assembly 1A, the hologram element unit 10, laser diode 2, and optical detector 3 are mounted on the frame 25 to be a one unit. Therefore, the optical system of the optical head assembly 1A can be made compact.

Note that, as a method for adjusting the attitude of each hologram element 11, 12, the active alignment method or the method using a microscope can be used in the same manner as the optical head assembly 1.

Figure 6A:
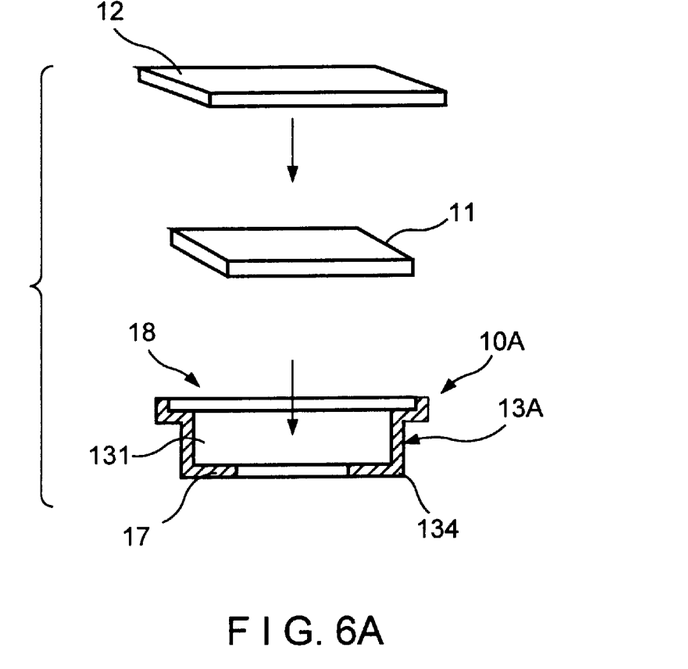
FIG. 6 shows a cross section of a modified example of the hologram element unit.
Figure 6B:
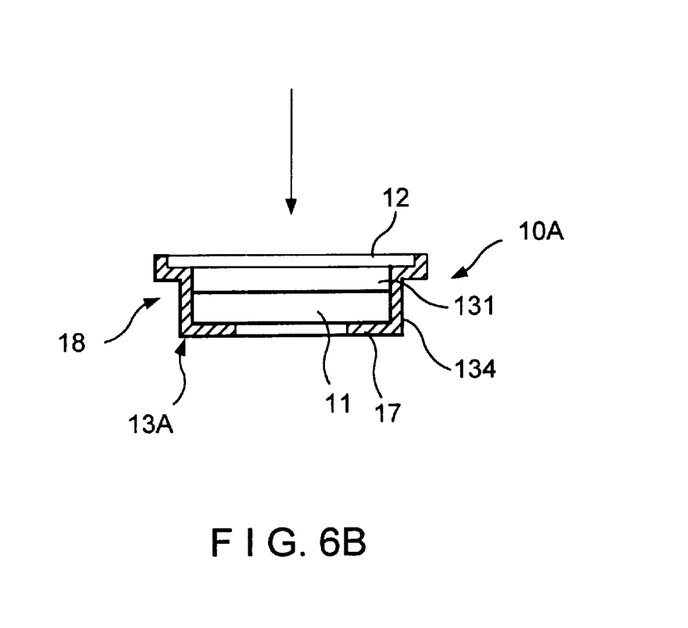

FIG. 6 shows a modified example of the hologram element unit. A hologram element unit 10A illustrated in this figure is a lens barrel having a rectangular through hole 131 in the center of a holder 13A, and an outer circumferential side surface serves as a circumferential surface 134. Note that an annular element positioning portion 17 projecting inwardly in the radius direction is formed at one of the opening portions of the through hole 131, and therewith the mounting position of the first hologram element 11 having a smaller outer diameter than that of the second element 12 is determined. Also, an element-positioning portion 18 which annularly projects outward in the radius direction and then is bent upright (in the figure) is formed at the other opening portion, and therewith the mounting position of the second hologram element 12 having a larger outer diameter than that of the first hologram element 11 is determined. Even with the hologram element unit 10A configured in such a manner that the element-positioning portion 17 for the smaller diameter first hologram element 11 is provided on the inner side and the element-positioning portion 18 for the larger diameter second hologram element 12 is provided on the outer edge surface, the mounting position of each hologram element 11, 12 can be determined in the same manner as the above mentioned hologram element unit 10.

Note that the holder fitting hole 21 of a circular cross section at the holder retaining portion 20 in the First and Second Embodiments is not necessarily provided, but it is acceptable as long as a guiding plane (fiducial surface) is formed for fittingly supporting the hologram element unit 10 in the circumferential direction (around the axial line of the optical axis L) while the holder retaining portion 20 maintains the mounting position of the hologram element unit 10 in the optical axis L direction. In addition, the holder 13 for the hologram element unit 10 is not necessarily a cylindrical shape, but it is acceptable as long as it is capable of fittingly contacting the guiding plane (fiducial surface) formed the holder retaining portion 20. Moreover, instead of forming the laser diode 2 and optical detector 3 on the single substrate 6, these members may be formed on separate substrates.

Although the hologram element is used as a diffraction grating means in the First and Second Embodiments, elements other than the hologram element having a predetermined diffraction property may be used.

As described above, in the optical head assembly of the present invention, the diffraction grating unit for holding the diffraction grating means at a predetermined position is mounted in the diffraction grating unit retaining portion formed in the assembly to determine the mounting position of the diffraction grating unit in the optical axis direction of the assembly by the position-determining portion formed at the diffraction grating unit retaining portion. Since the diffraction grating unit contacts the guiding plane of the diffraction grating unit retaining portion which turns to be a fiducial surface, the mounting position of the diffraction grating unit on a plane orthogonal to the optical axis of the assembly and the position thereof with respect to the optical axis can be determined optimally. Furthermore, when turning the diffraction grating unit around the axial line of the optical axis thereof to adjust the direction of the grating pattern, the diffraction grating unit fittingly contacts the guiding plane of the diffraction grating unit retaining portion; therefore, the previously determined positions and the angles will not be changed. Thus, after attaching the diffraction grating unit in the diffraction grating unit retaining portion, the diffraction grating unit is simply turned around the axial line of the optical axis to adjust the direction of the diffraction pattern of the diffraction grating pattern in order to complete the adjustment of the diffraction grating means. In this manner, the adjustment of the diffraction grating means can be completed in a short time, reducing the necessary cost while obtaining fine adjustment precision.

While the foregoing description and drawings represent the preferred embodiments of the present invention, it will be obvious to those skilled in the art that various changes and modifications may be made therein without departing from the true spirit and scope of the present invention.

What is claimed is:

1. An optical head assembly comprising:

a laser light source;

an objective lens for converging a laser light emitted from said laser light source on an optical recording medium;

an optical detector for detecting a returning light from said optical recording medium;

a diffraction grating unit mounted in an optical path between said laser light source and said objective lens for positioning multiple diffraction grating means;

a base of the optical head assembly for supporting said objective lens, said laser light source, and said optical detector; and a diffraction grating unit retaining portion formed on said base for holding said diffraction grating unit, said diffraction grating unit having a holder for positioning and holding each of said diffraction grating means, said holder having a circumferential surface which extends along an optical axis of said optical head assembly, and said diffraction grating unit retaining portion having a positioning portion for determining a mounting position of said diffraction grating unit in said optical axis direction of said optical head assembly and a guiding plane with which said circumferential surface fittingly contacts when said diffraction grating unit is turned around an axial line thereof;

said multiple diffraction grating means including separate diffraction-grating optical elements;

said diffraction grating unit having a common holder for positioning and holding each of said diffraction-grating optical elements, said common holder having separate positioning portions for positioning each of said diffraction-grating optical elements so that a distance between one and the other of said diffraction-grating optical elements is substantially identical and a relationship of diffraction patterns of one and the other of said diffraction-grating optical elements is also identical when said diffraction grating unit is turned around the axial line thereof.

2. The optical head assembly as set forth in claim 1 wherein said holder includes a cylindrical portion having an outer circumferential side surface which serves as said circumferential surface, and said diffraction grating unit retaining portion includes a hole to which said cylindrical portion is inserted and an inner circumferential surface of which serves as said guiding plane.

3. The optical head assembly as set forth in claim 1 wherein said diffraction grating unit retaining portion is constructed on a frame that supports said laser light source and optical detector, said frame being held on said base together with said objective lens.

4. The optical head assembly as set forth in claim 3 wherein said frame is constructed using an optical axis of said optical head assembly as a reference.

5. The optical head assembly as set forth in claim 1 wherein said diffraction grating unit has diffraction grating means positioning portions for positioning said multiple diffraction grating means.

6. The optical head assembly as set forth in claim 5 wherein said diffraction grating means positioning portions are configured such that one of said diffraction grating means having a smaller outer diameter is formed on said diffraction grating means positioning portion on said laser light source side and the other of diffraction grating means having a larger outer diameter is formed on said diffraction grating means positioning portion on said objective lens side.

7. The optical head assembly as set forth in claim 5 wherein said diffraction grating unit has a through hole passing through in the optical axis direction of said optical head assembly, and said diffraction grating means positioning portions are formed at opening portions on both ends of said through hole.

8. The optical head assembly as set forth in claim 7 wherein said diffraction grating means positioning portions formed at said openings of said through hole are respectively shaped corresponding to outer features of said multiple diffraction grating means, and said multiple diffraction grating means being fitted to said openings and positioned.

9. The optical head assembly as set forth in claim 7 wherein said diffraction grating means positioning portions are constituted with an annular projection formed on an inner circumferential side surface of said through hole.

10. The optical head assembly as set forth in claim 1 wherein said multiple diffraction grating means are made of multiple hologram elements which are respectively given a predetermined diffraction property.

11. An optical head assembly comprising:

a laser light source;

an objective lens for converging a laser light emitted from said laser light source on an optical recording medium;

an optical detector for detecting a returning light from said optical recording medium;

a diffraction grating unit mounted in an optical path between said laser light source and said objective lens for positioning multiple diffraction grating means;

a base of the optical head assembly for supporting said objective lens, said laser light source, and said optical detector;

a diffraction grating unit retaining portion formed on said base for holding said diffraction grating unit, said multiple diffraction grating means including a first and second diffraction-grating optical elements, said first diffraction-grating optical element being mounted apart from said second diffraction-grating optical element, said first diffraction-grating optical element having a diffraction property of guiding the returning light to the optical detector, and said second diffraction-grating optical element having a diffraction property of splitting the laser light into multiple laser beams;

a holder for positioning and holding said multiple diffraction grating means, said holding having a cylindrical portion having an outer circumferential side surface which serves as said circumferential surface, and said diffraction grating unit retaining portion includes a hole to which said cylindrical portion is inserted and an inner circumferential surface of which serves as said guiding plane.

* * * * *